United States Patent [19]

Wagner

[11] Patent Number: 4,488,792

[45] Date of Patent: Dec. 18, 1984

[54] EYEGLASSES WITH QUICK CONNECT AND DISCONNECT TEMPLE PIECES

[76] Inventor: Otto W. Wagner, 2927 E. Burnside St., Portland, Oreg. 97214

[21] Appl. No.: 480,472

[22] Filed: Mar. 30, 1983

[51] Int. Cl.³ .............................................. G02C 5/22
[52] U.S. Cl. ................................... 351/153; 351/111; 351/116
[58] Field of Search ............... 351/153, 116, 101, 106, 351/107, 111, 115, 121, 158; 16/228

[56] References Cited

U.S. PATENT DOCUMENTS 1,284,071 11/1918 Dorney ................................ 351/116
3,418,041 12/1968 Courtney ............................ 351/121

Primary Examiner—Rodney B. Bovernick
Assistant Examiner—Paul M. Dzierzynski
Attorney, Agent, or Firm—Eugene D. Farley

[57] ABSTRACT

An eyeglass assembly having removable temple pieces. A spring arm has on one end a hinge pin and on the other end means for mounting the arm on the temple piece. The arm is shiftable between an advanced position wherein the pin unites the knuckles to form a hinged connection, thereby attaching the temple pieces to the front frame piece, and a retracted position wherein the pin is removed from the knuckles. This detaches the temple pieces from the front frame piece and enables use of the latter separately, for example, in a gas mask where the temple pieces would interfere with the proper placement of the mask.

7 Claims, 5 Drawing Figures

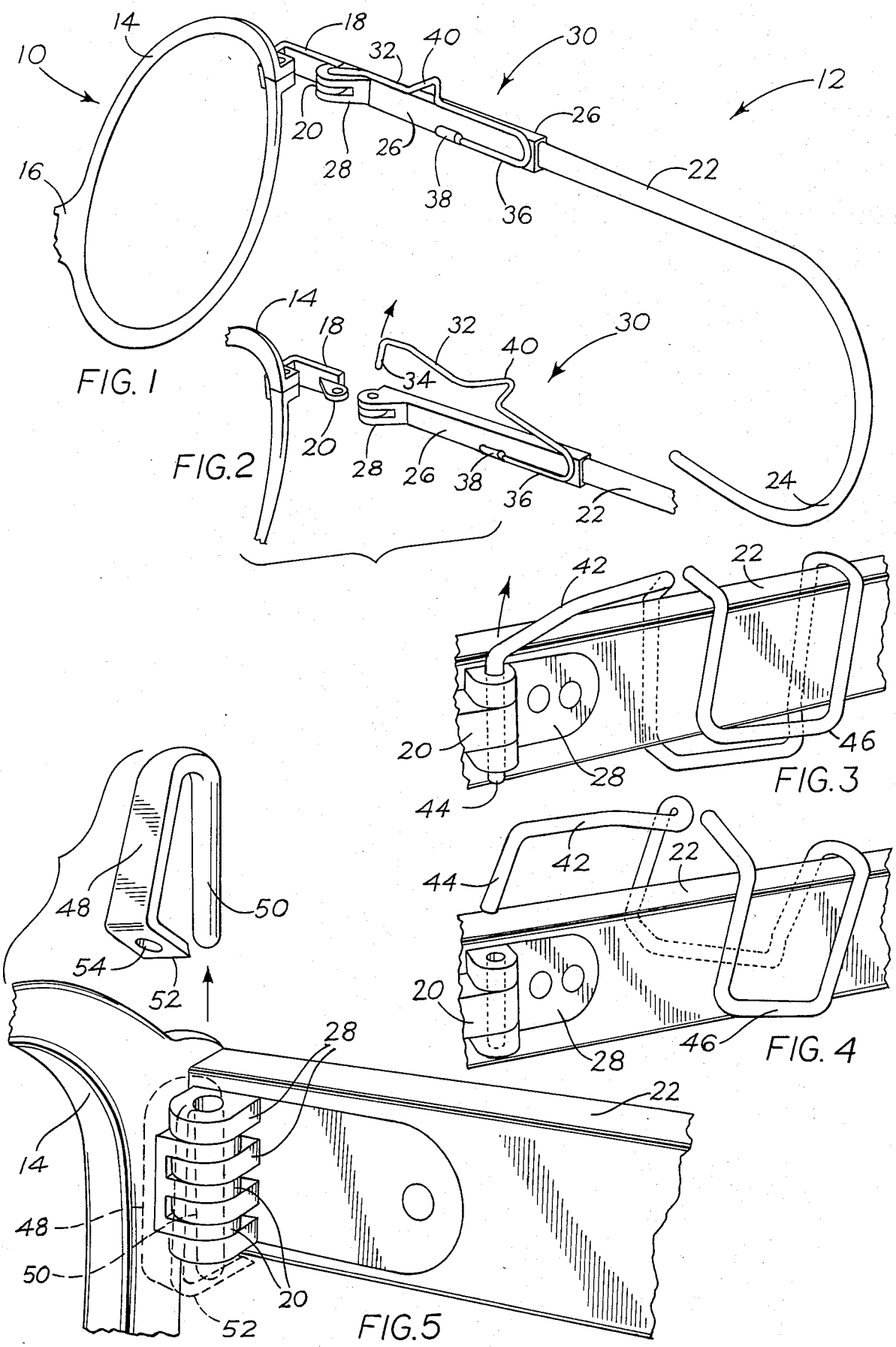

EYEGLASSES WITH QUICK CONNECT AND DISCONNECT TEMPLE PIECES

BACKGROUND AND GENERAL STATEMENT OF THE INVENTION

This invention relates to eyeglasses with temple pieces which may be quickly connected and disconnected to the front frame piece, as required in a structure such as gas masks where independent use of the front frame piece with its component lenses is required.

The most commonly used style of eyeglasses comprises a front piece, which includes the lenses, hinged through pin and knuckle hinges to a pair of temple pieces having bows which attach the eyeglasses to the ears of the wearer. However, there are situations in which it is desirable to use the frame front piece and lenses independently of the temple pieces.

Such a situation exists in the use of gas masks, which require the mask to fit tightly around the face of the user. In such a situation it is not possible for the user to wear eyeglasses of the type described since the temple pieces would project outside the periphery of the mask and prevent the required tight fit of the mask about the face.

The conventional solution to this problem is to provide eyeglasses without temple pieces which attach to the gas mask through an attaching device mounted on the eyeglass bridge. Such an assembly is illustrated in Wise et al U.S. Pat. No. 3,563,640. Although this assembly achieves the desired purpose of providing the gas mask user with eyeglasses which do not interfere with the proper functioning of the mask, it forces the user to purchase an extra pair of prescription glasses, one for use in his gas mask and the other for ordinary wear, with attendant extra expense.

It is the general object of the present invention to provide an eyeglass assembly having a front frame piece which may be disconnected and connected quickly and easily from the associated temple pieces, without damaging either component of the assembly. This makes it possible to use the front piece with associated lenses independently, as in a gas mask. It also makes possible use of the front piece temple piece assembly in the usual manner when gas mask use is not contemplated.

A further object of the invention is the provision of an eyeglass assembly having quick connect and disconnect temple pieces, which assembly is non-injurious to the wearer, of inconspicuous appearance and easily adaptable for use with any of the conventional eyeglasses of the type having a front piece connected to two temple pieces through the agency of knuckle-type hinges.

The foregoing and other objects of my invention are accomplished by the provision of an eyeglass assembly having a front frame piece, a pair of temple pieces, mating hinge knuckles on the front frame and temple pieces, and removable pin means for releasably interconnecting the front frame and temple pieces.

Each pin means comprises an arm, preferably a spring arm, and a pin on one end of the arm dimensioned for insertion into the knuckles when in mated position. On the other end of the arm is a mounting means for mounting the arm on the eyeglasses for shifting movement between an advanced engaging position and a retracted releasing position. In the advanced position the temple pieces are coupled to the front frame pieces so that the glasses can be used in conventional manner. In the retracted position, the temple pieces may be removed from the front piece and the latter applied to special uses, as for example, in a gas mask.

DESCRIPTION OF SPECIFIC EMBODIMENTS OF THE INVENTION

In the drawings:

FIG. 1 is a fragmentary perspective view of the eyeglasses of the invention in a first embodiment;

FIG. 2 is a fragmentary, exploded, perspective view of the eyeglasses of FIG. 1, illustrating the manner of connecting and disconnecting the temple pieces to and from the front piece;

FIGS. 3 and 4 are fragmentary perspective views illustrating the eyeglasses of the invention in another embodiment, with the temple pieces connected to and disconnected from the front piece, respectively; and FIG. 5 is a fragmentary exploded view of the eyeglass assembly of the present invention in a third embodiment.

As shown in the drawings, the eyeglass assembly to which the present invention pertains comprises broadly a front frame piece or "front" indicated generally at 10, to which are hinged a pair of temple pieces, referred to generically as "temples", and indicated generally at 12.

The front frame piece includes a pair of lens-supporting frames or rims 14 connected in the usual manner by a bridge 16. Each of the lens-supporting frames carries on its outer margin a bracket 18 on which is mounted a knuckle hinge component 20.

Temple 12 comprises the usual elongated wire or plastic elongated member 22 which terminates at its outer end in an ear-encircling loop or bow 24. The temple has a sleeve extension 26 which may be fabricated from metal, or provided with a metal insert. Sleeve 26 mounts knuckle hinge components 28 which mate with knuckle hinge components 20 on the front frame piece with the openings through the knuckles registering in conventional manner. The openings may be internally threaded and designed to receive a threaded pin, not shown, which releasably couples the two parts.

The connecting pin normally is of very small dimensions and difficult to insert and remove without magnification and a special appliance. It is the purpose of my invention to provide removable pin means which renders quick and easy the coupling and uncoupling operations so that the front frame piece with its lens components may be used independently when this is desired, as in the case of a gas mask application.

One such removable pin means is illustrated generally at 30 in FIGS. 1 and 2.

As illustrated, it may be fabricated from a continuous length of wire or other spring material. It comprises an arm 32 which terminates at its forward end in a pin 34. The pin lies substantially at right angles to the arm and is dimensioned for reception in hinge knuckles 20, 28 when the knuckles are in mated position with their respective openings aligned.

Arm 32 is mounted on the temple piece through the agency of an integral, reversely-bent, rearward end 36 which may be adherently united or welded to sleeve 26, as indicated at 38.

To facilitate the connecting and disconnecting operations, arm 32 may be provided with an integral, outwardly extending tab 40 which serves as a finger grip.

To operate the device, spring arm 32 is elevated to its FIG. 2 position, knuckles 20, 28 mated, and pin 34 inserted into the registering openings in the knuckles. The device then assumes its FIG. 1 position, with the temple pieces securely attached to the front frame piece.

When it is desired to disconnect the temple pieces, the procedure is reversed. Spring arm 32 is elevated, removing the pin from the hinge knuckles. The two pieces then are separated.

The embodiment of FIGS. 3 and 4 is similar, except that a different means of mounting the spring arm on each temple piece is employed.

In this embodiment the spring pin assembly comprises a spring arm 42 having at its forward end a pin 44 which lies substantially at right angles to the spring arm.

Integrally formed with the spring arm and pin is a mounting clip 46 dimensioned for sliding frictional engagement with temple piece 22. Its dimensions are such that it may be slid on and off the temple piece at will. When it is in the operative position of FIGS. 3, it grips the temple piece and secures the pin in the connected position. However, it may be flexed to its FIG. 4 position to disconnect the pin from the knuckles when it is desired to disconnect the temple piece from the front frame piece.

Still another embodiment of the eyeglass assembly of my invention is illustrated in FIG. 5.

In this embodiment the removable pin means comprises a spring arm 48 and an integral pin 50 which in its normal position lies spaced from and substantially parallel to the spring arm. The pin assembly is releasably secured to the knuckle in operative position through the agency of a mounting base 52 provided with an aperture 54. The aperture is sized to receive the end of pin 50.

Accordingly, the pin assembly may be inserted in the knuckles and locked in position by inserting the end of pin 50 in base aperture 50 in the manner illustrated in full line in FIG. 5. However, it may be sprung and removed to the dashed line position of that figure when separation of the temple piece from the front frame piece is desired.

Having thus described my invention in preferred embodiments, I claim:

1. An eyeglass assembly comprising
   (a) a front frame piece,
   (b) a pair of temple pieces,
   (c) mating hinge knuckles on the front frame and temple pieces, and
   (d) removable pin means for releasably interconnecting the front frame and temple pieces, each pin means comprising:
      (1) an arm,
      (2) on one end of the arm pin means dimensioned for insertion into the knuckles when in registering mated position, and
      (3) on the other end of the arm, mounting means for mounting the arm on the eyeglass assembly for shifting movement between an advanced position wherein the pin means is inserted in the mated knuckles, thereby securing the temple piece to the front frame piece, and a retracted position wherein the pin means is removed from the knuckles, thereby detaching the temple piece from the front frame piece.

2. The eyeglass assembly of claim 1 wherein the arm comprises a spring arm.

3. The eyeglass assembly of claim 2 wherein the spring arm lies at substantially right angles to the pin means, and the mounting means comprises a segment of the spring arm adherently united to the temple piece.

4. The eyeglass assembly of claim 3 wherein the temple piece has a metal component and the arm segment comprises a reversely bent segment soldered to the metal component of the temple piece.

5. The eyeglass assembly of claim 3, including a finger tab positioned centrally of the spring arm for shifting the latter between its advanced and retracted positions.

6. The eyeglass assembly of claim 2 wherein the spring arm lies at substantially right angles to the pin means and wherein the mounting means comprises an integral clip dimensioned and arranged for clipping the spring arm to the temple piece.

7. The eyeglass assembly of claim 2 wherein the spring arm lies spaced from and substantially parallel to the pin means and the pin means is of a length sufficient to extend completely through the knuckles and to project therefrom, and wherein the mounting means comprises a spring arm segment bent substantially at right angles to the arm and positioned for engagement with the projecting end of the pin means.

* * * * *